(12) United States Patent
Oohara

(10) Patent No.: US 7,015,598 B2
(45) Date of Patent: Mar. 21, 2006

(54) POWER CONTROL APPARATUS FOR A BICYCLE

(75) Inventor: Kouji Oohara, Sakai (JP)

(73) Assignee: Shimano, Inc., Osaka (JP)

( * ) Notice: Subject to any disclaimer, the term of this patent is extended or adjusted under 35 U.S.C. 154(b) by 383 days.

(21) Appl. No.: 10/226,496

(22) Filed: Aug. 23, 2002

(65) Prior Publication Data

US 2003/0197427 A1    Oct. 23, 2003

Related U.S. Application Data

(63) Continuation-in-part of application No. 10/131,151, filed on Apr. 23, 2002.

(51) Int. Cl.
H02J 1/16 (2006.01)

(52) U.S. Cl. .............................. 307/47; 307/68; 474/70

(58) Field of Classification Search ................. 474/70; 307/47, 65, 66, 68
See application file for complete search history.

(56) References Cited

U.S. PATENT DOCUMENTS

| | | | |
|---|---|---|---|
| RE27,983 E | 4/1974 | Steams | |
| 4,143,557 A | 3/1979 | Wakebe et al. | |
| 4,962,462 A * | 10/1990 | Fekete ......................... | 700/297 |
| 5,357,177 A | 10/1994 | Fey et al. ...................... | 318/3 |
| 5,358,451 A | 10/1994 | Lacombe et al. | |
| 5,414,335 A | 5/1995 | Sato ............................. | 318/466 |
| 5,455,774 A | 10/1995 | Khawand et al. | |
| 5,612,580 A * | 3/1997 | Janonis et al. ............... | 307/64 |
| 5,847,641 A | 12/1998 | Jinbo | |
| 6,122,181 A * | 9/2000 | Oughton, Jr. ................. | 363/37 |
| 6,163,445 A | 12/2000 | Zoellick | |
| 6,192,300 B1 | 2/2001 | Watarai et al. | |
| 6,216,078 B1 | 4/2001 | Jinbo et al. | |
| 6,222,343 B1 * | 4/2001 | Crisp et al. .................. | 320/110 |
| 6,569,045 B1 | 5/2003 | Campagnolo | |
| 6,646,400 B1 * | 11/2003 | Uno ............................ | 318/479 |
| 2001/0027495 A1 | 10/2001 | Campagnolo | |

FOREIGN PATENT DOCUMENTS

| | | |
|---|---|---|
| DE | 200 16 669 U1 | 2/2001 |
| DE | 199 48 798 A1 | 5/2001 |
| EP | 21266 A1 | 1/1981 |
| EP | 1216916 A2 | 6/2002 |
| GB | 2061033 A * | 5/1981 |
| GB | 2126438 A * | 3/1984 |
| GB | 2161040 A * | 1/1986 |
| JP | 10-109681 A | 4/1998 |
| JP | 10-291491 | 11/1998 |
| JP | 2001-311737 A | 11/2001 |
| JP | 2001-318005 A | 11/2001 |
| WO | WO 81/01274 | 5/1981 |

* cited by examiner

Primary Examiner—Brian Sircus
Assistant Examiner—Brett Squires
(74) Attorney, Agent, or Firm—James A. Deland

(57) ABSTRACT

A power control apparatus for a bicycle that uses a first power supply and a second power supply to provide electrical power includes a voltage sensor for sensing a voltage from the first power supply. A control unit is coupled to the voltage sensor and is coupled for receiving power from the first power supply and the second power supply. The control unit outputs power from the second power supply when the voltage sensed by the voltage sensor is below a selected value, and the control unit outputs power from the first power supply when the voltage sensed by the voltage sensor is above the selected value.

23 Claims, 11 Drawing Sheets

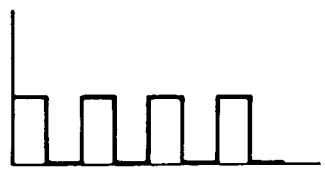
FIG. 8(A)
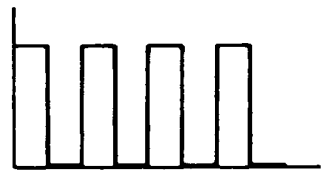
FIG. 8(B)
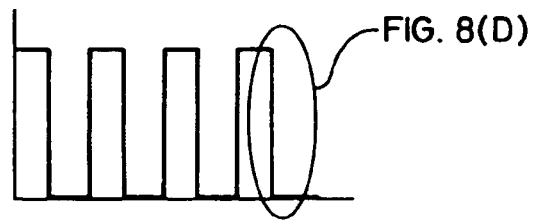
FIG. 8(C)
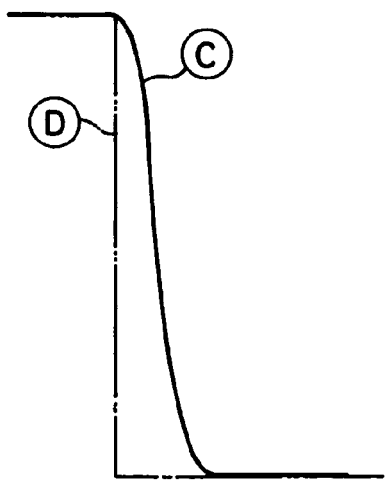
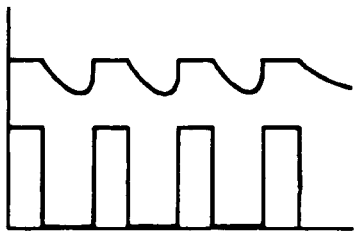
FIG. 8(E)
FIG. 8(F)
FIG. 8(D)

US 7,015,598 B2

POWER CONTROL APPARATUS FOR A BICYCLE

CROSS REFERENCE TO RELATED APPLICATIONS

This application is a continuation-in-part of copending application Ser. No. 10/131,151, filed Apr. 23, 2002.

BACKGROUND OF THE INVENTION

The present invention is directed to bicycles and, more particularly, to inventive features of a power control apparatus for a bicycle.

Many bicycle signal processing systems have been developed. A typical system often gathers and displays information related to bicycle speed, cadence, distance traveled and the like. Such systems usually include a magnet mounted to a wheel spoke, a magnet mounted to one of the pedal cranks, and magnet sensors mounted to the bicycle frame for sensing the passage of the magnets as the wheel and crank revolve. An electrical pulse is generated every time a magnet passes its associated sensor (e.g., once per wheel or crank revolution). The speed of the bicycle can be calculated based on the number of pulses received from the wheel sensor per unit of time and the circumference of the wheel. Similarly, the distance traveled can be calculated based on the number of pulses received over a length of time and the circumference of the wheel. The cadence can be calculated based on the number of pulses received from the crank sensor per unit of time. One or more switches ordinarily are provided for entering operating parameters (e.g., the wheel circumference), for selecting what information is displayed to the rider, and for starting and stopping various timers used for calculating the desired information.

More sophisticated systems have the ability to display information related to the state of the bicycle transmission. For example, some bicycles have a plurality of front sprockets that rotate with the pedal cranks, a plurality of rear sprockets that rotate with the rear wheel, and a chain that engages one of the front sprockets and one of the rear sprockets. A front derailleur is mounted to the bicycle frame for shifting the chain among the plurality of front sprockets, and a rear derailleur is mounted to the bicycle frame for shifting the chain among the plurality of rear sprockets. Manually operated switches or levers may control the front and rear derailleurs. Position sensors (e.g., potentiometers or contact sensors) are mounted to the switches or levers so that the front and rear sprockets currently engaged by the chain may be determined by the positions of the corresponding switches or levers. Such information may be displayed to the rider so that the rider may operate the transmission accordingly. Even more sophisticated systems use small electric motors to control the bicycle transmission. The motors may be controlled manually by the foregoing switches or levers, or automatically based on bicycle speed and/or cadence.

The switches, sensors and other electrical components of the signal processing system require electrical power to operate. Such power may be supplied from simple batteries or from a dynamo that generates power from the rotation of one of the bicycle wheels. Batteries have the disadvantage that they are drained by the operation of the signal processing system and must be recharged or replaced. Larger batteries can be used to accommodate greater power requirements, but such batteries can add excessive weight to the bicycle. Dynamos have the disadvantage that they stop generating power when the bicycle is stopped, and the signal processing system may malfunction accordingly.

SUMMARY OF THE INVENTION

The present invention is directed to features of a power control apparatus for a bicycle that can be used with multiple power sources to achieve benefits not available from or in addition to those available by using a single power source. In one embodiment of the present invention, a power control apparatus is provided for a bicycle that uses a first power supply and a second power supply. The power control apparatus includes a voltage sensor for sensing a voltage from the first power supply. A control unit is coupled to the voltage sensor and is coupled for receiving power from the first power supply and the second power supply. The control unit outputs power from the second power supply when the voltage sensed by the voltage sensor is below a selected value, and the control unit outputs power from the first power supply when the voltage sensed by the voltage sensor is above the selected value.

BRIEF DESCRIPTION OF THE DRAWINGS

FIGS. 8(A)–8(F) are diagrams showing the waveforms of signals at various points in the circuit shown in FIGS. 7(A) and 7(B);

DETAILED DESCRIPTION OF THE EMBODIMENTS

Figure 1:
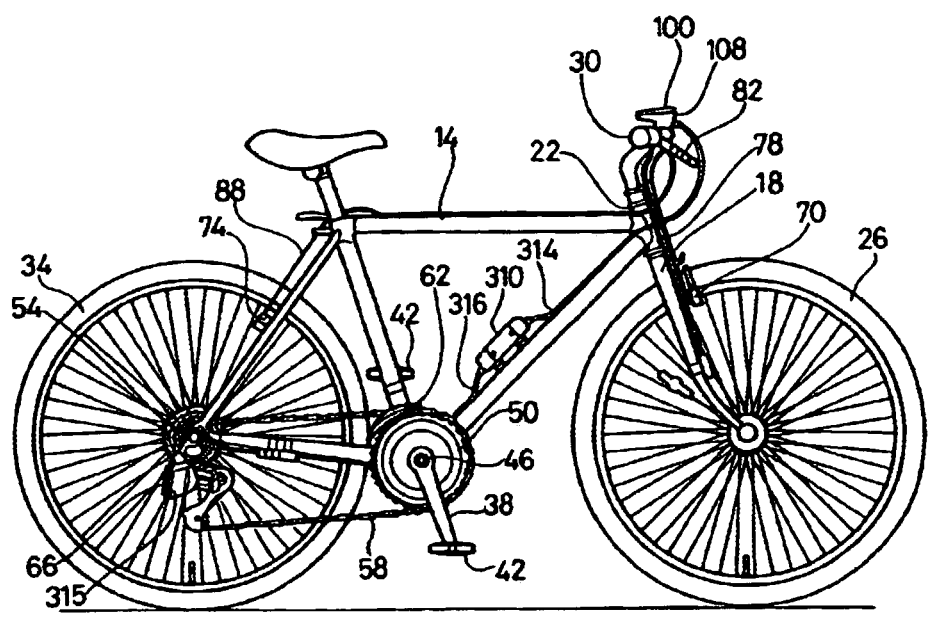
FIG. 1 is a side view of a bicycle that includes a particular embodiment of a signal processing device.
Figure 2:
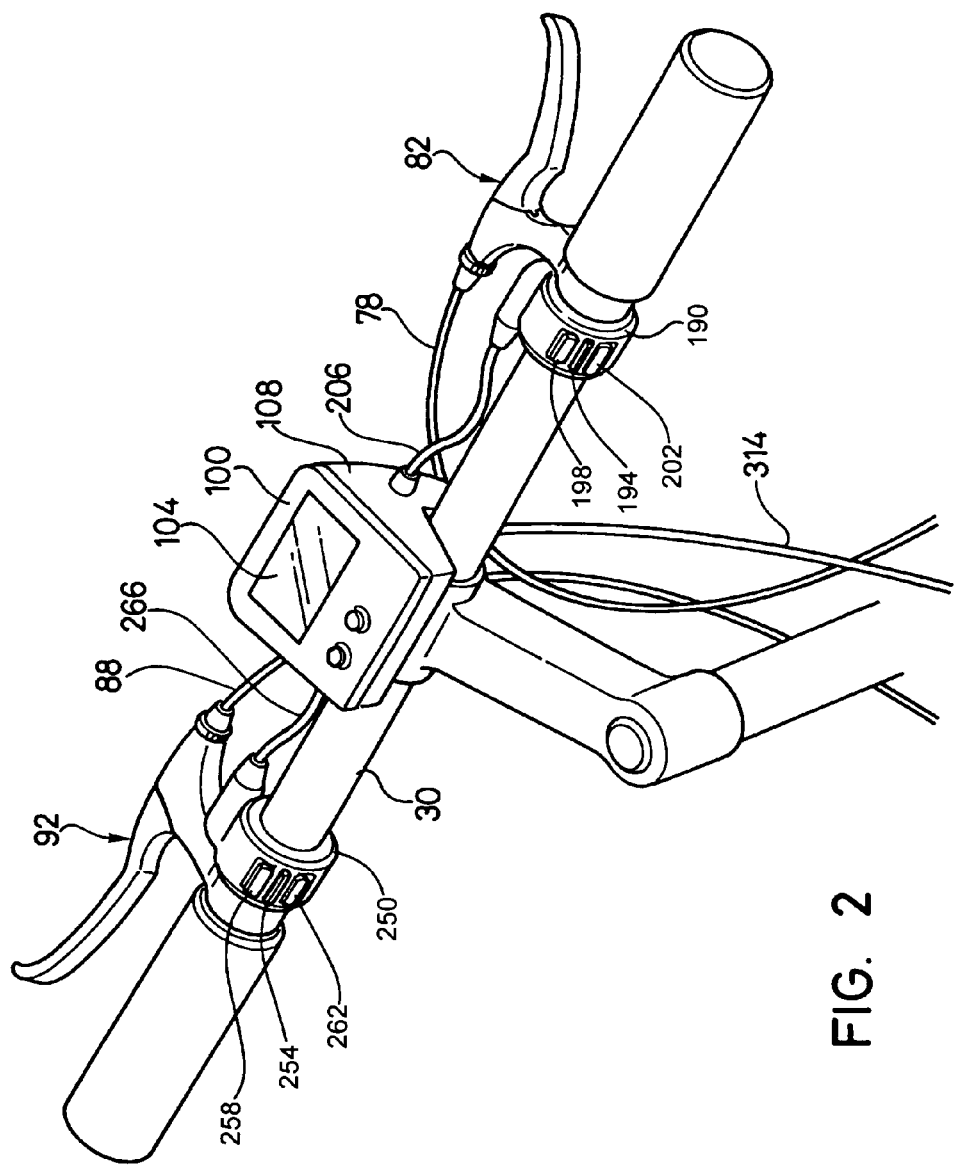
FIG. 2 is an oblique view of the handlebar mounted components of the signal processing device.
Figure 3A:
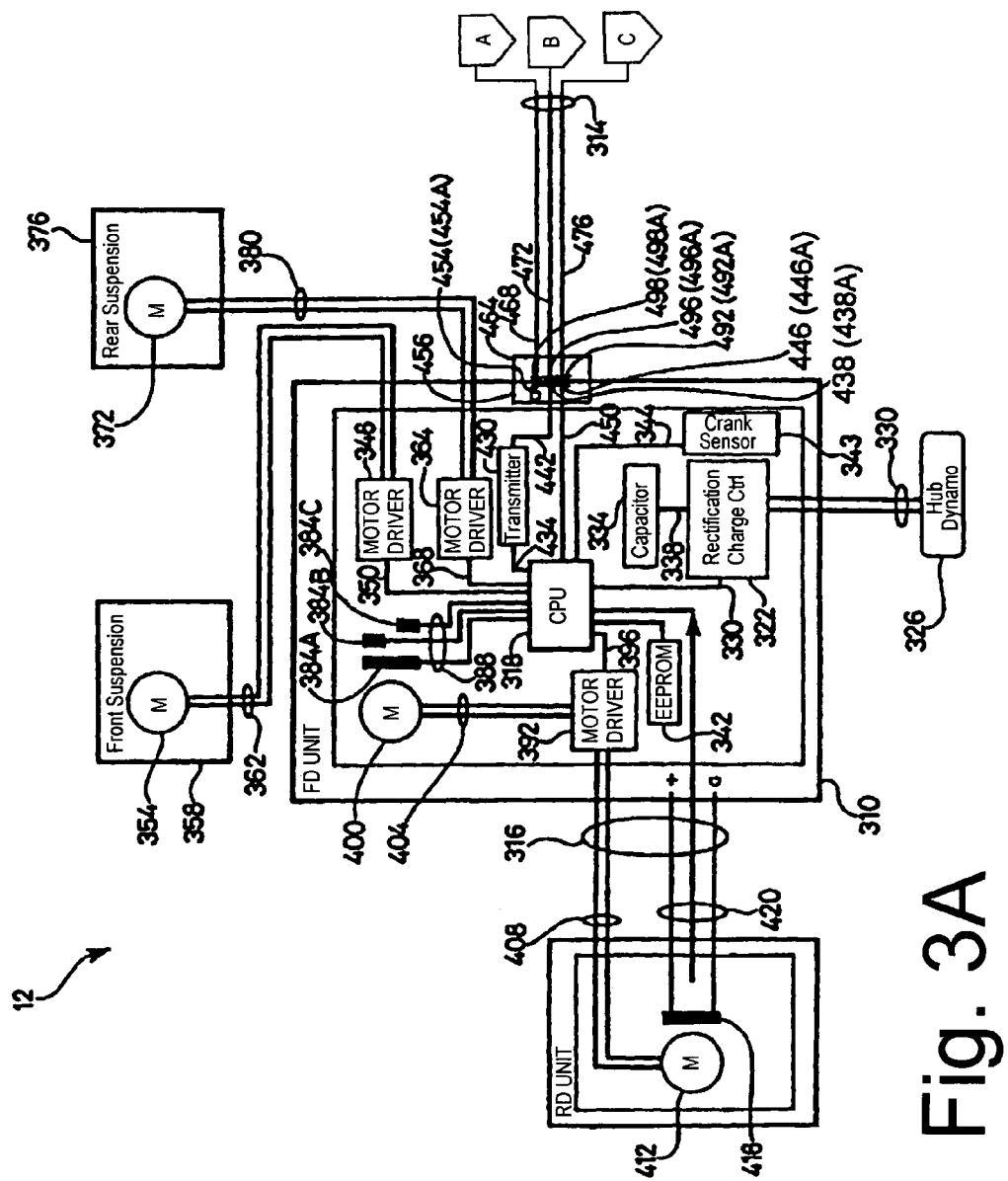
FIGS. 3A and 3B are detailed block diagrams of a particular embodiment of the signal processing device.
Figure 3B:
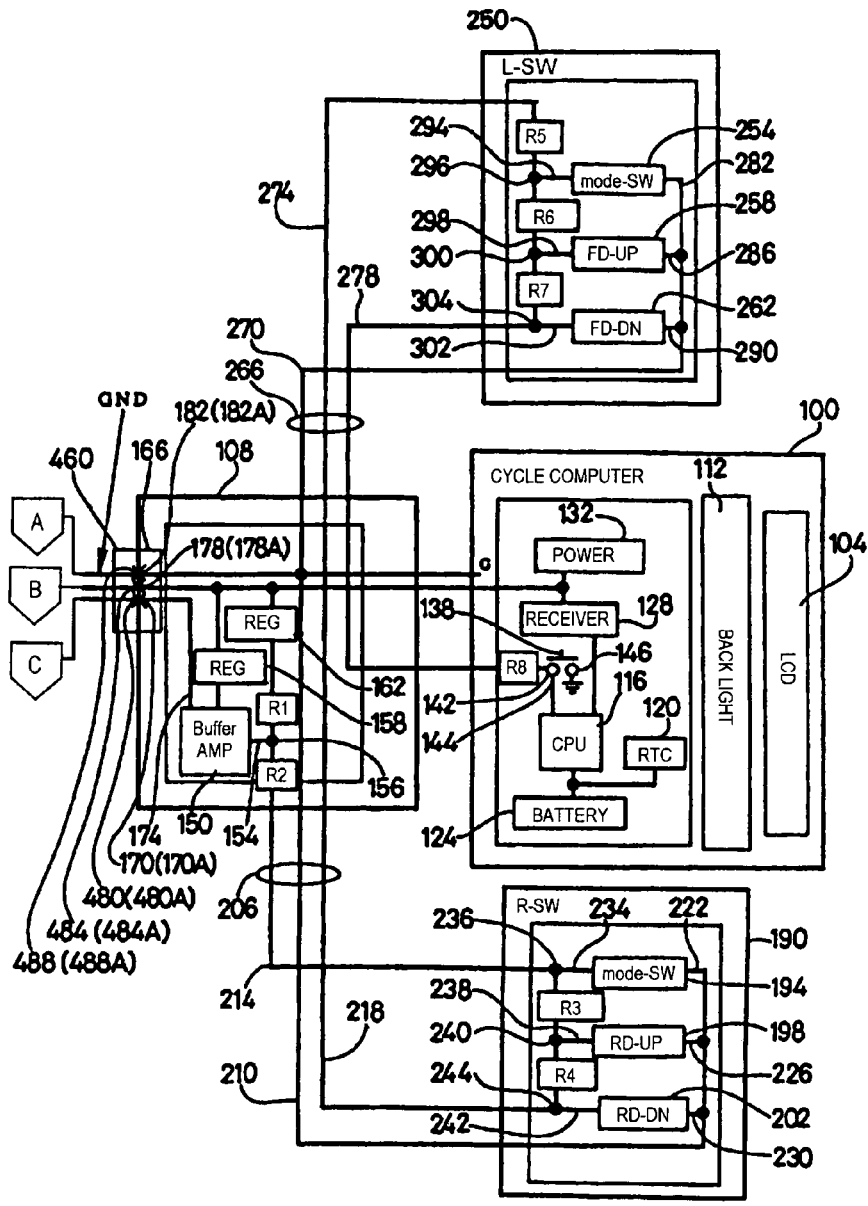

FIG. 1 is a side view of a bicycle 10 that includes a particular embodiment of a signal processing device 12 (FIG. 3). Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of front sprockets 50 are mounted to the right side crank arm 38 for rotating with the right side crank arm 38, and a plurality of rear sprockets 54 are mounted to the rear wheel 34 for rotating with rear wheel 34. A chain 58 engages one of the front sprockets 50 and one of the rear sprockets 54. A front derailleur 62 is mounted to frame 14 in close proximity to the plurality of front sprockets 50 for moving chain 58 among the plurality of front sprockets 50, and a rear derailleur 66 is mounted to frame 14 in close proximity to the plurality of rear sprockets 54 for moving chain 58 among the plurality of rear sprockets 54. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 that is connected to a brake lever assembly 82 mounted on the right side of handlebar 30 as shown in FIG. 2. Similarly, rear braking unit 74 is connected to a Bowden-type control cable 88 that is connected to a brake lever assembly 92 mounted on the left side of handlebar 30.

As shown in FIGS. 1–3, a display housing 100 having an LCD display 104 is coupled to a mounting bracket 108 attached to handlebar 30. As shown in FIG. 3, display housing 100 houses a backlight 112 for display 104, a processor 116 for controlling the operation of display 104, a real time clock (RTC) circuit 120 for providing timing information, a battery 124 for providing optional power for the data stored in processor 116, a receiver circuit 128 for receiving data in a manner described below, a power circuit 132 for receiving power in a manner described below, a resistance (e.g., resistor) R8 coupled to processor 116, and a switch 138 having a terminal 142 coupled to a node 144 between resistance R8 and processor 116 for selecting the information displayed on display 104. The other terminal 146 of switch 138 is connected to a ground potential.

Mounting bracket 108 houses serially connected resistances (e.g., resistors) R1 and R2, a buffer amplifier 150 having an input terminal 154 connected to a node 156 between resistances R1 and R2, a voltage regulator 158 for supplying a regulated voltage to buffer amplifier 150, a voltage regulator 162 for supplying a regulated voltage to resistance R1, and a connector 166. Connector 166 includes an external output terminal 170 connected to an output terminal 174 of buffer amplifier 150, a power/data input terminal 178 for communicating power to voltage regulators 158 and 162 in mounting bracket 108 and to power circuit 132 in display housing 100 and for communicating data to receiver circuit 128 in display housing 100, and a ground terminal 182 for providing a ground potential to the components in mounting bracket 108 and display housing 100. External output terminal 170, power/data input terminal 178 and ground terminal 182 have exposed contact surfaces 170a, 178a and 182a, respectively.

In this embodiment, the relevant signal processing elements within display housing 100 are directly connected to the relevant signal processing elements within mounting bracket 108. In other embodiments, display housing 100 may be detachably mounted to mounting bracket 108 in a known manner, wherein exposed electrical contacts (in electrical communication with the relevant components in display housing 100) on display housing 100 contact exposed electrical contacts (in electrical communication with the relevant components in mounting bracket 108) on mounting bracket 108.

A right switch housing 190 containing a mode switch 194, a rear derailleur upshift switch 198, a rear derailleur downshift switch 202 and serially connected resistances (e.g., resistors) R3 and R4 is mounted to the right side of handlebar 30. The relevant signal processing elements within right switch housing 190 are coupled to an intermediate communication path 206 which, in this embodiment, comprises a ground potential communication path 210, a resistance communication path 214 and a resistance communication path 218. More specifically, ground potential communication path 210 is connected to a terminal 222 of mode switch 194, to a terminal 226 of rear derailleur upshift switch 198 and to a terminal 230 of rear derailleur downshift switch 202. Another terminal 234 of mode switch 194 is connected to a node 236 on resistance communication path 214 near resistance R3, another terminal 238 of rear derailleur upshift switch 198 is connected to a node 240 between resistances R3 and R4, and another terminal 242 of rear derailleur downshift switch 202 is connected to a node 244 on resistance communication path 218 near resistance R4.

A left switch housing 250 containing a mode switch 254, a front derailleur upshift switch 258, a front derailleur downshift switch 262 and serially connected resistances (e.g., resistors) R5, R6 and R7 is mounted to the left side of handlebar 30. The relevant signal processing elements within left switch housing 250 are coupled to an intermediate communication path 266 which, in this embodiment, comprises a ground potential communication path 270, a resistance communication path 274 and a resistance communication path 278. More specifically, ground potential communication path 270 is connected to a terminal 282 of mode switch 254, to a terminal 286 of front derailleur upshift switch 258 and to a terminal 290 of front derailleur downshift switch 262. Another terminal 294 of mode switch 254 is connected to a node 296 between resistances R5 and R6, another terminal 298 of front derailleur upshift switch 258 is connected to a node 300 between resistances R6 and R7, and another terminal 302 of front derailleur downshift switch 262 is connected to a node 304 on resistance communication path 278 near resistance R7. Resistance communication path 274 is connected to resistance R5.

As shown in FIG. 1, a front derailleur control housing 310 is mounted to frame 14, and it is coupled to mounting bracket 108 through an intermediate communication path 314. A rear derailleur control housing 315 is mounted to rear derailleur 66, and it is electrically coupled to front derailleur control housing 310 through an intermediate communication path 316. As shown in FIG. 3, front derailleur control housing 310 contains a processor 318, a rectifier and charge control circuit 322 for receiving current from a hub dynamo 326 mounted to rear wheel 34 (not shown) through a communication path 330 and for supplying power to processor 318 through a communication path 330, a capacitance (e.g., capacitor) 334 coupled to rectifier and charge control circuit 322 through a communication path 338 for storing power for use by rectifier and charge control circuit 322, and a programmable memory 342 for storing the programming for processor 318. A crank sensor 343 coupled to processor 318 through a communication path 344 is provided for sensing signals from a magnet (not shown) coupled to the left side crank arm 38. An optional motor driver 346 is coupled to processor 318 through a communication path 350 for controlling the operation of a motor 354 through a communication path 362 for adjusting an optional front suspension 358, and an optional motor driver 364 is coupled to processor 318 through a communication path 368 for controlling the operation of a motor 372 through a communication path 380 for adjusting an optional rear suspension 376. A contact sensor shown as contacts 384a, 384b and 384c is coupled to processor 318 through a communication path 388 for providing signals indicating the position of a front derailleur motor 400 used to position front derailleur 62. A motor driver 392 is coupled to processor 318 through a communication path 396 for controlling the operation of front derailleur motor 400 through a communication path 404. Motor driver 392 also provides signals over a communication path 408, which is part of intermediate communication path 316, for controlling the operation of a rear derailleur motor 412 contained in rear derailleur control housing 315. A potentiometer 416 contained in rear derailleur control housing 315 is coupled to processor 318 through a communication path 420, which is part of intermediate communication path 316, for providing signals indicating the position of motor 412, and hence rear derailleur 66.

A power/data transmitter 430 is coupled to processor 318 through a communication path 434 for providing power and data signals through a communication path 442 to an external power/data output terminal 438 having a contact surface 438a. An external switch signal input terminal 446 having a contact surface 446a is coupled to processor 318 through a communication path 450, and a ground terminal 454 having a contact surface 454a is used to communicate a ground potential among the components in front derailleur control housing 310. Terminals 438, 446 and 454 form part of a connector 456.

As noted above, front derailleur control housing 310 is electrically connected to mounting bracket 108 through an intermediate communication path 314. Intermediate communication path 314 includes a connector 460 that couples to connector 166 on mounting bracket 108, a connector 464 that couples to connector 456 on front derailleur control housing 310, an intermediate ground potential communication path 468, an intermediate power/data communication path 472, and an intermediate switch signal communication path 476. In this embodiment, each communication path 468, 472 and 476 comprises a wire, but of course one or more of these communication paths may be an optical communication element or be replaced by a wireless communication method. In this embodiment, connector 460 includes connector terminals 480, 484 and 488 with contact surfaces 480a, 484a and 488a for contacting the respective contact surfaces 170a, 178a and 182a of external output terminal 170, power/data input terminal 178 and ground terminal 182. Similarly, connector 464 includes terminals 492, 496 and 498 with contact surfaces 492a, 496a and 498a for contacting the respective contact surfaces 446a, 438a and 454a of switch signal input terminal 446, power/data output terminal 438 and ground terminal 454.

Figure 4:
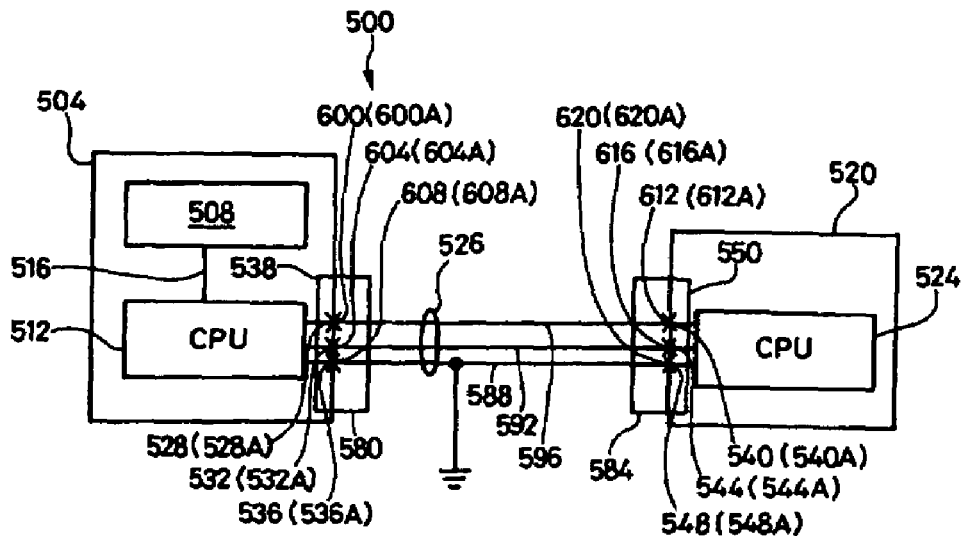
FIG. 4 is conceptual schematic diagram of a prior art signal processing device.

Before continuing with the description of signal processing device 12, it may be helpful to consider a prior art signal processing device 500 shown conceptually in FIG. 4. As shown in FIG. 4, signal processing device 500 includes a housing 504 containing a signal processing element 508 (a switch, sensor, etc.) connected to a processor 512 through a communication path 516, a housing 520 containing a processor 524, and an intermediate communication path 526. Processor 512 is connected to external terminals 528, 532 and 536 having respective contact surfaces 528a, 532a and 536a. Similarly, processor 524 is connected to external terminals 540, 544 and 548 having respective contact surfaces 540a, 544a and 548a. Terminals 528, 532 and 536 form part of a connector 538, and terminals 540, 544 and 548 form part of a connector 550. Intermediate communication path 526 includes a connector 580 for coupling to connector 538 on housing 504, a connector 584 for coupling to connector 550 on housing 520, an intermediate ground potential communication path 588, an intermediate power/data communication path 592, and an intermediate data signal communication path 596. Intermediate ground potential communication path 588 is shown coupled to a ground potential because the ground potential need not originate in processor 512 or processor 524. Such a ground potential may exist at the terminal of a power supply, at the metallic or other conductive elements forming housings 504 and/or 520, or even the bicycle frame or other conductive components attached to the bicycle. Each communication path 588, 592 and 596 typically comprises a wire. The signals on communication paths 592 and 596 typically are high impedance signals, and very little current flows through them. Connector 580 includes connector terminals 600, 604 and 608 with contact surfaces 600a, 604a and 608a for contacting the respective contact surfaces 528a, 532a and 536a of terminals 528, 532 and 536. Similarly, connector 584 includes terminals 612, 616 and 620 with contact surfaces 612a, 616a and 620a for contacting the respective contact surfaces 540a, 544a and 548a of external terminals 540, 544 and 548.

If water were to enter between connector 580 and connector 538, for example, there is a possibility that the water, being somewhat conductive, will form a conductive path between communication paths 592 and/or 596 and the ground potential. The effect may be similar to current siphoned off through a resistance of, for example, 1K ohms to a ground potential. Since the signals on intermediate communication paths 592 and 596 are high impedance signals, and since the current flowing through the intermediate communication paths 592 and 596 is very small, the voltage appearing at processor 524 will vary greatly even if the current lost through the conductive path is small. Indeed, it is possible that a complete short circuit may result. In any event, such a voltage variation may cause processor 524 to malfunction. To prevent such malfunctioning, it is necessary that connectors 580 and 584 be constructed to provide a waterproof seal. This not only increases the initial cost of the device, but over time the connectors may lose their waterproof quality, thus requiring replacement of the connectors, if not the entire device.

Figure 5:
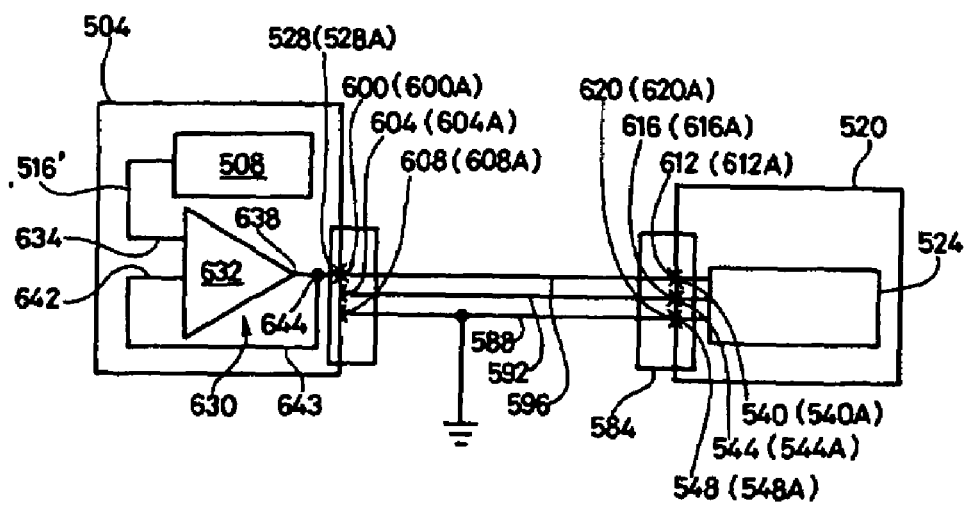
FIG. 5 is a conceptual schematic diagram showing a particular embodiment of an impedance converting circuit.

FIG. 5 is a conceptual schematic diagram showing how the circuit of FIG. 4 is modified in accordance with the present embodiment. In this case, signal processing element 508 is not connected through processor 512 (processor 512 has been omitted from the diagram, but processor 512 still may be connected for communicating with intermediate communication paths 588 and 592 as shown in FIG. 4). Instead, signal processing element 508 is connected to intermediate data signal communication path 596 through an impedance converting circuit 630 that converts the high impedance switch signal appearing on communication path 516' into a low impedance switch signal that is communicated on intermediate data signal communication path 596. In this example, impedance converting circuit 630 may be an operational amplifier 632 having an input terminal 634 connected to communication path 516', an output terminal 638 connected to external terminal 528, and an input terminal 642 connected to a feedback path 643 that is connected to a node 644 between output terminal 638 and external output terminal 528.

Figure 6:
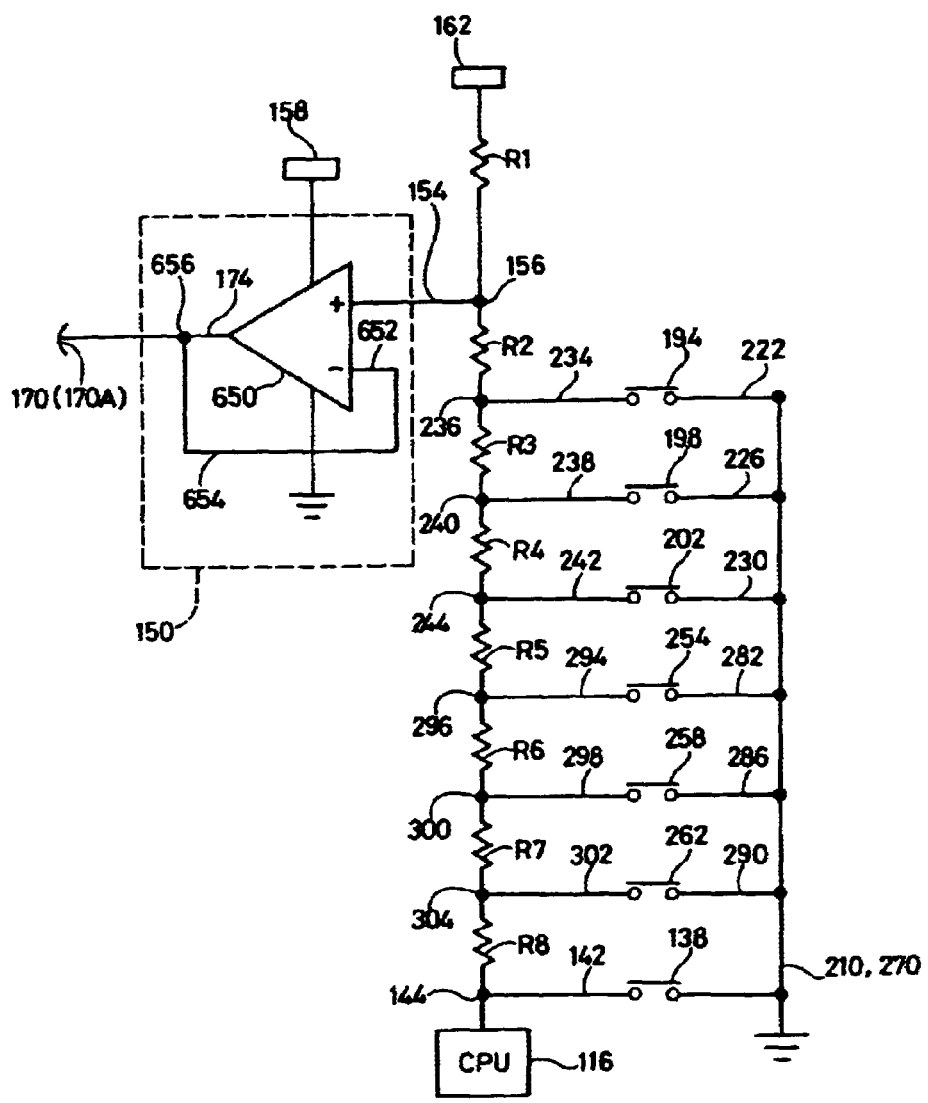
FIG. 6 is a schematic diagram of a particular embodiment of a signal processing element and impedance converting circuit.

FIG. 6 is a detailed schematic diagram showing how the principles of the present embodiment are applied to the device shown in FIG. 3. Buffer 150 functions as an impedance converting circuit, and in this embodiment it comprises an operational amplifier 650 having the input terminal 154 connected to the node 156 between resistances R1 and R2, the output terminal 174 connected to external output terminal 170, and an input terminal 652 connected to a feedback path 654 that is connected to a node 656 between output terminal 174 and external output terminal 170. One of ordinary skill in the art will readily recognize that, in this embodiment, operational amplifier 650 is configured as a noninverting, unity gain amplifier. Buffer 150 converts the high impedance signal at input terminal 154 into a low impedance signal at output terminal 174. The signal at output terminal 174 has an impedance of substantially zero.

Resistances R1–R8 are connected together in series, with switches 194, 198, 202, 254, 258 and 262 each having one terminal connected to a node 236, 240, 244, 296, 300 and 304, respectively, between adjacent pairs of the resistances. The other terminals of switches 194, 198, 202, 254, 258 and 262 are connected to the ground potential appearing on ground potential communication paths 210 and 270. Resistances R1–R8 thus function as a voltage divider such that the analog voltage appearing at input terminal 154 of operational amplifier 650 (and hence output terminal 174 of operational amplifier) will vary depending upon which switch 194, 198, 202, 254, 258 and 262 is closed. In this embodiment, resistances R1–R8 have values of 10 k, 2.2 k, 2.2 k, 2.2 k, 3.3 k, 5.6 k, 8.2 k and 18 k ohms, respectively.

Because the varying voltage signal set by the switches 194, 198, 202, 254, 258 and 262 and appearing at output terminal 174 of operational amplifier 650 is a low impedance signal, it will be substantially unaffected by any water that enters between connectors 166 and 460 and/or connectors 456 and 464. Also, the switch signals may be communicated directly to the processor 318 in front derailleur control housing 310. Thus, it is not necessary to incur the expense of using a separate processor to process the switch signals as in the prior art. Operational amplifier 650 also stabilizes the voltages for use by processor 318 (e.g., 10 millivolts either way).

As noted above when discussing the prior art device shown in FIG. 4, conventional devices have separate power and data communication paths for communicating power and data from one signal processing element to another. The present device shown in FIG. 3 is constructed to eliminate such separate communication paths and to communicate power and data over a single communication path. More specifically, the device shown in FIG. 3 includes power/data transmitter 430 in front derailleur control housing 310 for communicating power and data over communication path 442, then to intermediate power/data communication path 472, and ultimately to receiver circuit 128 and power circuit 132 in display housing 100.

Figure 7A:
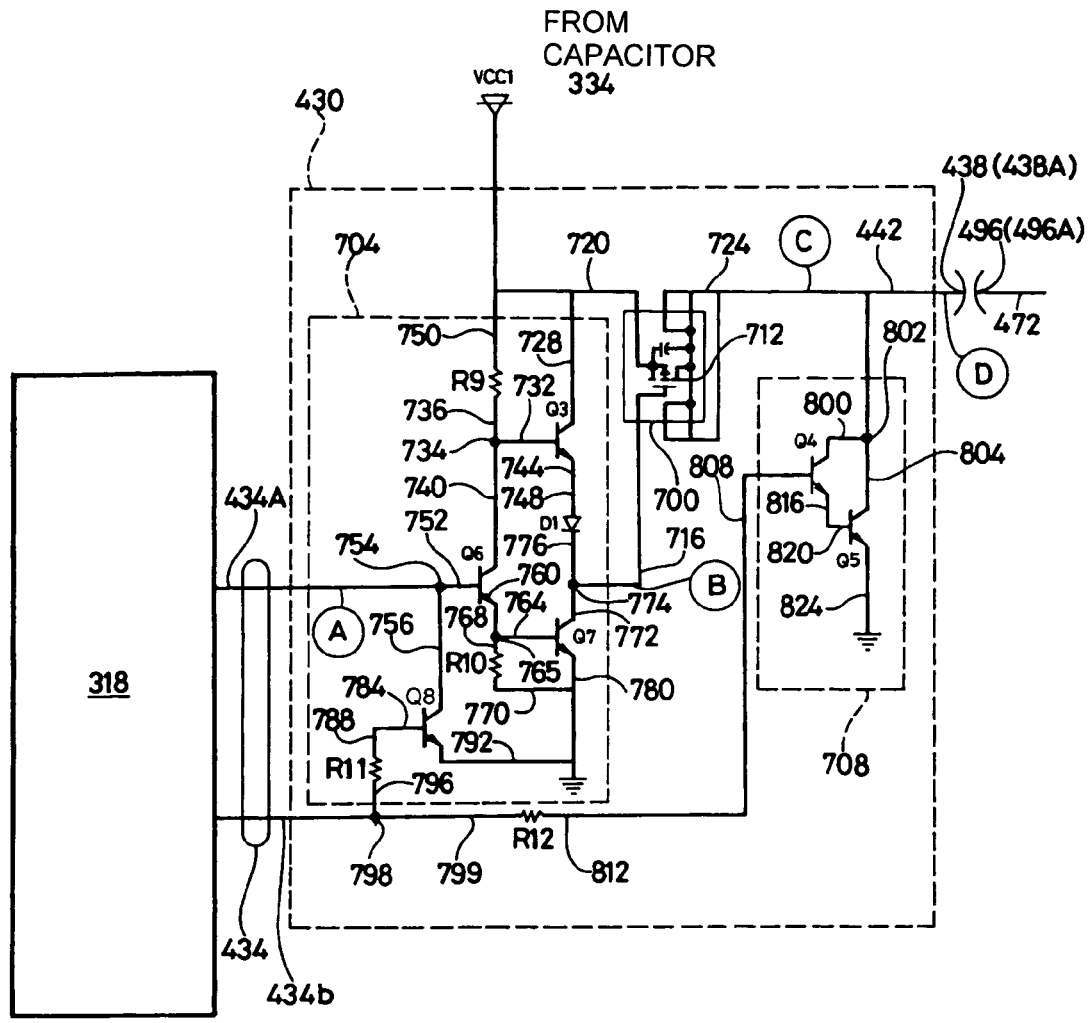
FIGS. 7(A) and 7(B) together comprise a schematic diagram of a circuit for communicating power and data from a first signal processing element to a second signal processing element.
Figure 7B:
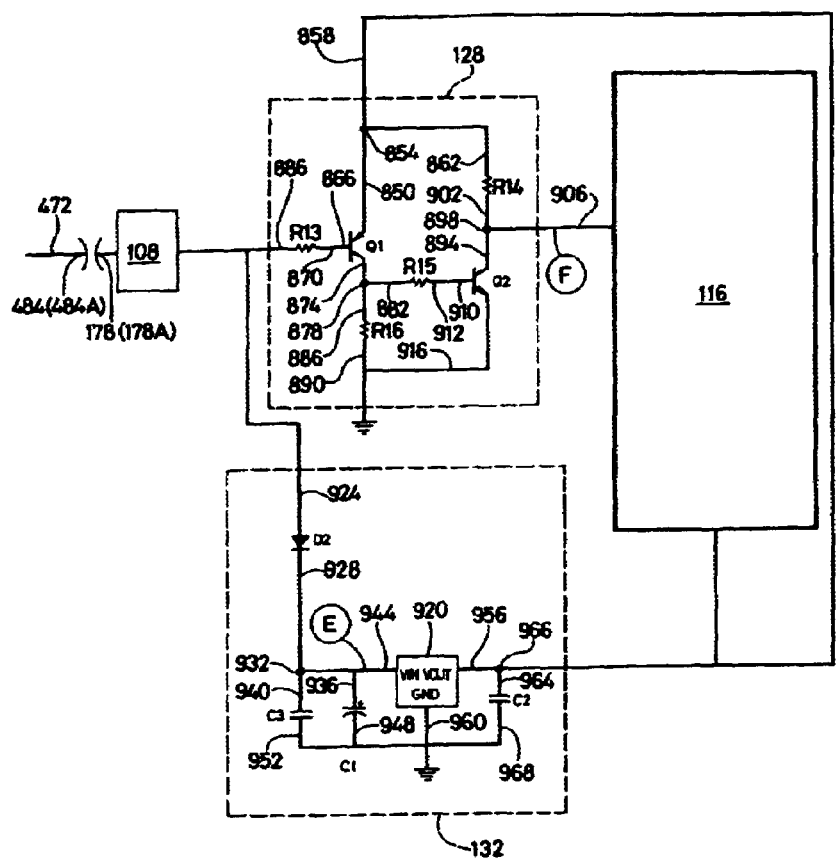

FIGS. 7(A) and 7(B) together comprise a detailed schematic diagram of the relevant components of transmitter 430, receiver circuit 128 and power circuit 132. Transmitter 430 comprises a switching circuit 700, a gate drive circuit 704, and a signal shaping circuit 708. Switching circuit 700 comprises a field-effect transistor 712 having a gate terminal 716, a source terminal 720 coupled for receiving a voltage Vcc from capacitance 334 (FIG. 4), and a drain terminal 724 coupled to communication path 442.

Gate drive circuit 704 controls the operation of switching circuit 700, and it includes NPN bipolar transistors Q3, Q6, Q7 and Q8, resistances (e.g., resistors) R9, R10 and R11, and diode D1. Transistor Q3 has a collector terminal 728 coupled for receiving voltage Vcc, a base terminal 732 connected to a node 734 between a terminal 736 of resistance R9 and a collector terminal 740 of transistor Q6, and an emitter terminal 744 connected to an anode terminal 748 of diode D1. The other terminal 750 of resistance R9 is coupled for receiving voltage Vcc. Transistor Q6 further has a base terminal 752 connected to a node 754 on communication path 434a from processor 318, and an emitter terminal 760 connected to a node 765 between a base terminal 764 of transistor Q7 and a terminal 768 of resistance R10. The other terminal 770 of resistance R10 is coupled to a ground potential. Transistor Q7 further has a collector terminal 772 connected to a node 774 between gate terminal 716 and a cathode terminal 776 of diode D1, and an emitter terminal 780 coupled to a ground potential. Transistor Q8 further has a base terminal 784 connected to a terminal 788 of resistance R11, and an emitter terminal 792 coupled to a ground potential. The other terminal 796 of resistance R11 is connected to a node 798 between communication path 434b from processor 318 and a terminal 799 of resistance R12.

Signal shaping circuit 708 shapes the signal appearing at drain terminal 724 of transistor 712 of switching circuit 700, and it includes NPN bipolar transistors Q4 and Q5. Transistor Q4 includes a collector terminal 800 connected to a node 802 between drain terminal 724 of transistor 712 and a collector terminal 804 of transistor Q5, a base terminal 808 connected to the other terminal 812 of resistance R12, and an emitter terminal 816 connected to a base terminal 820 of transistor Q5. The emitter terminal 824 of transistor Q5 is coupled to a ground potential.

The operation of transmitter 430 may be understood by the signals shown in FIGS. 8(A)–8(D). Lower voltage switching signals shown in FIG. 8(A) (approximately 3.0 volts) are produced by processor 318 on communication path 434(A) (point (A) in FIG. 7(A)), and such signals cause gate drive circuit 704 to produce the higher voltage gate drive signals shown in FIG. 8(B) (approximately 4.5 volts) at gate terminal 716 of transistor 712 (point (B)) to operate switching circuit 700. In response, switching circuit 700 produces the signals shown in FIGS. 8(C) and 8(D) at drain terminal 724 (point (C)). Processor 318 produces the signals on communication path 434b to operate signal shaping circuit 708. The signals on communication path 434b are similar to the signals produced on communication path 434a (FIG. 8(A)) and are substantially the complements (opposites) of the signals produced on communication path 434a (taking into account propagation delay and necessary timing). These signals, through the operation of transistor Q8, ensure that gate drive circuit 704 rapidly shuts off transistor 712. The signals on communication path 434b also cause signal shaping circuit 708 to rapidly sink current from drain terminal 724 of transistor 712 to produce a signal on communication path 442 (point (D)) that more nearly resembles a square wave as shown in FIG. 8(E). The signals shown are for example only. In reality, the signals will have varying pulse widths. Also, in this embodiment the pulses should have a frequency greater than 20 Hz to avoid flicker in the display and other artifacts, but in other embodiments that may not be necessary.

As shown in FIG. 7(B), receiver circuit 128 comprises transistors Q1 and Q2 and resistances (e.g., resistors) R13, R14, R15 and R16. Transistor Q1 has a collector terminal 850 connected to a node 854 between a power line 858 and a terminal 862 of resistance R14, a base terminal 866 connected to a terminal 870 of resistance R13, and an emitter terminal 874 connected to a node 878 between a terminal 882 of resistance R15 and a terminal 886 of resistance R16. The other terminal 886 of resistance R13 is coupled through mounting bracket 108 to power/data input terminal 178, and the other terminal 890 of resistance R16 is coupled to a ground potential. Transistor Q2 has a collector terminal 894 connected to a node 898 between the other terminal 902 of resistance R14 and a communication path 906 to processor 116, a base terminal 910 coupled to the other terminal 912 of resistance R15, and an emitter terminal 916 coupled to a ground potential.

Power circuit 132 comprises a commercially available voltage regulator 920, capacitances (e.g., capacitors) C1–C3, and a diode D2. Diode D2 has an anode terminal 924 coupled through mounting bracket 108 to power/data input terminal 178 and a cathode terminal 928 connected to a node 932 between terminals 936 and 940 of capacitances C1 and C3 and an input terminal 944 of voltage regulator 920. The other terminals 948 and 952 of capacitances C1 and C3 are coupled to a ground potential. Voltage regulator 920 has an output terminal 956 coupled to power line 858 for supplying operating voltage to processor 116 and receiver circuit 128, and a ground terminal 960 coupled to a ground potential. Capacitance C2 has a terminal 964 connected to a node 966 between output terminal 956 and power line 858, and a terminal 968 coupled to a ground potential.

The operation of receiver circuit 128 and power circuit 132 may be understood by the signals shown in FIGS. 8(C)–8(F). The pulse signals output from switching circuit 700 (FIG. 8(C)) and shaped by signal shaping circuit 708 (FIG. 8(D)) are communicated over the single intermediate power/data communication path 472 and through mounting bracket 108 to receiver circuit 128 and power circuit 132. Diode D2 rectifies the incoming signal and charges capacitances C1 and C3 to produce the input signal shown in FIG. 8(E) on input terminal 944 (point (E)). Voltage regulator 920 and capacitance C2 thereafter produce a stable signal (approximately 3 volts) on output terminal 956. The power signal is communicated to processor 116 and receiver circuit 128 through power line 858. Receiver circuit 128 demodulates the incoming signal and produces the data signal shown in FIG. 8(F) (approximately 3 volts) on communication path 906 (point (F)).

Figure 9:
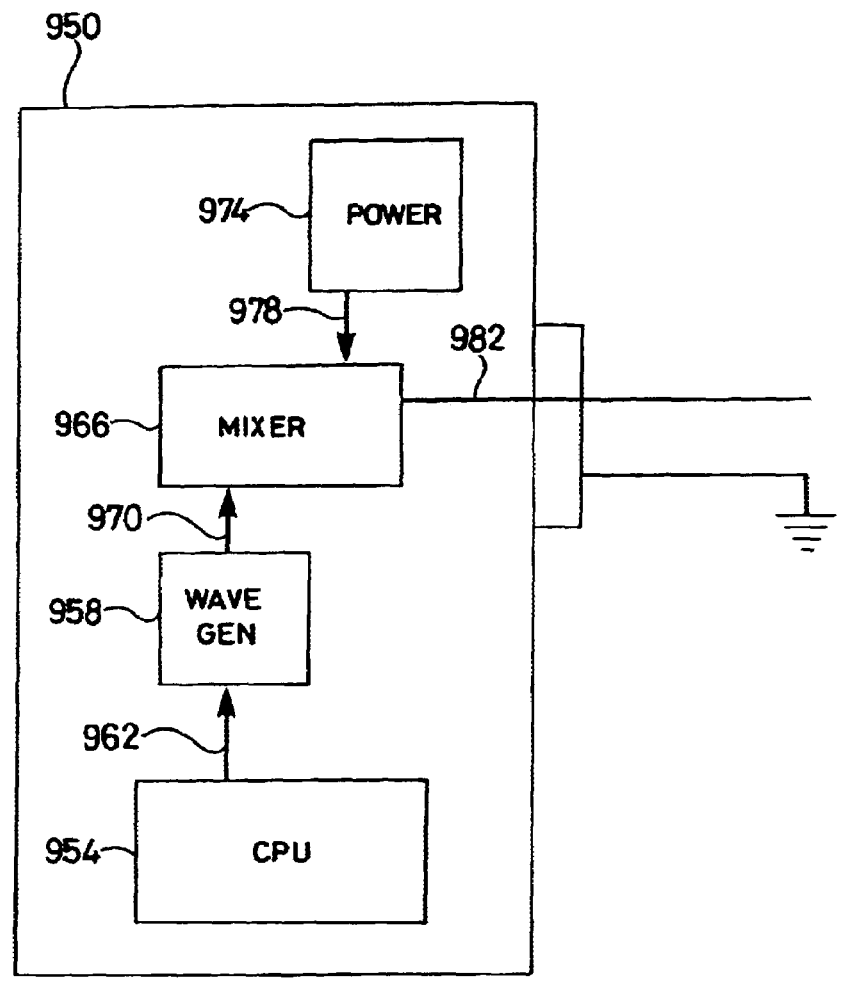
FIG. 9 is a block diagram of an alternative embodiment of a device for communicating power and data from a first signal processing element to a second signal processing element.

FIG. 9 is a block diagram of an alternative embodiment of a transmitter 970 for communicating power and data from a first signal processing element to a second signal processing element, wherein frequency modulation is employed. In this embodiment, a processor 972 controls a sine wave (or other waveform) generator 974 through a communication path 976. The generated waveform is communicated to a mixing circuit 978 through a communication path 980. Mixer 978 receives power from a power source 980 through a communication path 982, combines the power and waveform signals, and communicates the combined signals on a communication path 984. In such an embodiment, the frequency of the waveform should be less than 500 KHz to avoid radio interference or other artifacts, but that may not be necessary in other embodiments.

Figure 10:
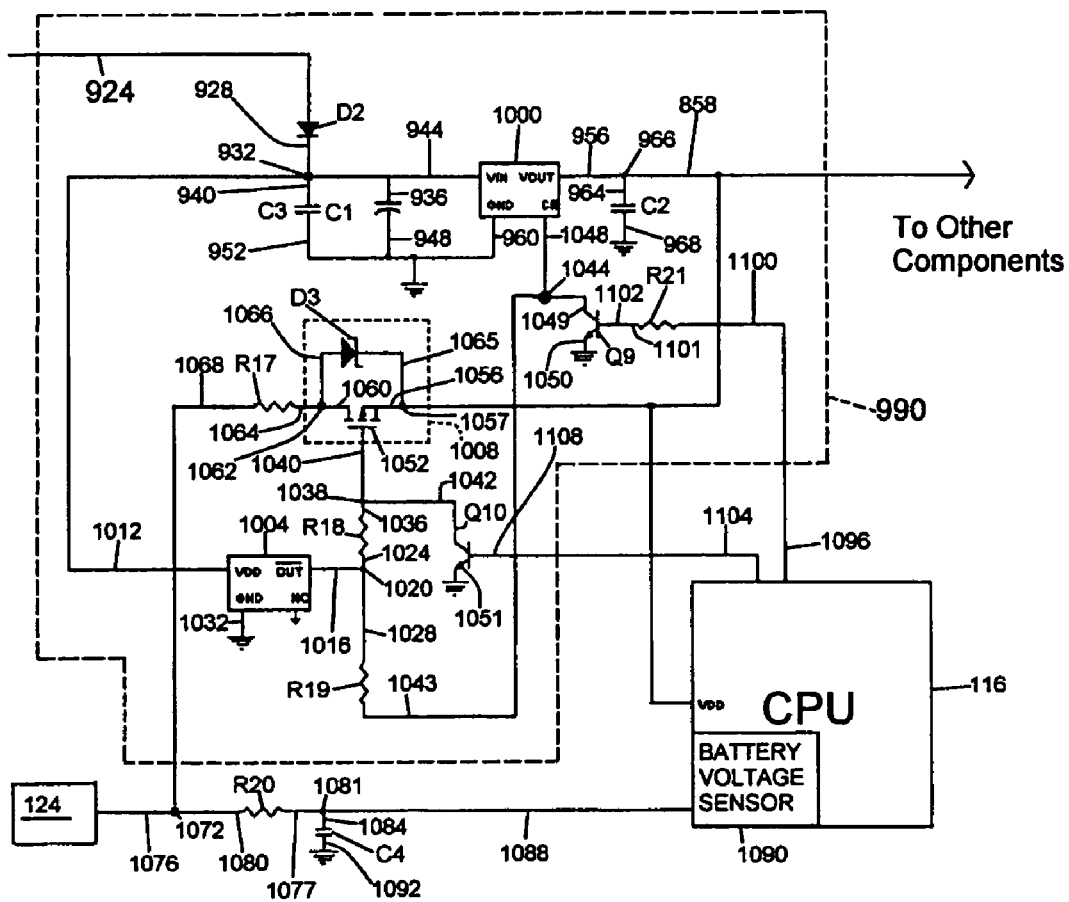
FIG. 10 is a schematic diagram of a particular embodiment of a power control apparatus.

FIG. 10 is a schematic diagram of an alternative embodiment of power circuit 132, labeled 990. This embodiment comprises a first power supply switch such as a commercially available switching voltage regulator 1000, capacitances C1–C3, and a diode D2 interconnected substantially as in the embodiment shown in FIG. (7B). That is, diode D2 has an anode terminal 924 coupled for receiving power from capacitance 334 (charged by dynamo 326) in front derailleur control housing 310, and a cathode terminal 928 connected to a node 932 at a junction of terminals 936 and 940 of capacitances C1 and C3 and an input terminal 944 of voltage regulator 1000. The other terminals 948 and 952 of capacitances C1 and C3, together with a ground terminal 960 of voltage regulator 1000 and a terminal 968 of capacitance C2, are coupled to a ground potential. Voltage regulator 1000 has an output terminal 956 connected to power line 858 for supplying operating voltage to processor 116, receiver circuit 128, and any other desired components. A terminal 964 of capacitance C2 is connected to a node 966 on power line 858.

Power circuit 990 also comprises a voltage sensor 1004, a second power supply switch such as a switching circuit 1008, NPN bipolar transistors Q9–Q10 and resistances (e.g., resistors) R17–R20. Voltage sensor 1004 has an input terminal 1012 connected to node 932, an output terminal 1016 connected to a node 1020 between terminals 1024 and 1028 of resistances R18 and R19, respectively, and a ground terminal 1032 coupled to a ground potential. Another terminal 1036 of resistance R18 is connected to a node 1038 between a control terminal 1040 of switching circuit 1008 and a collector terminal 1042 of transistor Q10, and another terminal 1043 of resistance R19 is connected to a node 1044 between a chip enable terminal 1048 of voltage regulator 1000 and a collector terminal 1049 of transistor Q9. Emitter terminals 1050 and 1051 of transistors Q9 and Q10, respectively, are coupled to a ground potential.

In this embodiment, switching circuit 1008 comprises a field-effect transistor 1052 and a diode D3. Control terminal 1040 is the gate terminal of transistor 1052. Transistor 1052 also has a source terminal 1056 connected to a node 1057 between a cathode terminal 1065 of diode D3 and power line 858, and a drain terminal 1060 connected to a node 1062 between a terminal 1064 of resistance R17 and an anode terminal 1066 of diode D3.

Another terminal 1068 of resistance R17 is coupled to a node 1072 between a terminal 1076 of battery 124 and a terminal 1080 of a resistance R20. Another terminal 1077 of resistance R20 is connected to a node 1081 between a terminal 1084 of a capacitance C4 and a battery monitor terminal 1088 of a second power supply voltage sensor such as a battery voltage sensor 1090 which, in this embodiment, is a program module within CPU 116. The other terminal 1092 of capacitance C4 is coupled to a ground potential. Switching circuit 1008 thus receives power from battery 124, and resistance R20 and capacitance C4 allow CPU 116 to monitor the voltage of battery 124. CPU 116 includes a first power supply switch override terminal 1096 connected to a terminal 1100 of a resistance R21. Another terminal 1101 of resistance R21 is connected to a base terminal 1102 of transistor Q9. CPU 116 also includes a second power supply switch override terminal 1104 connected to a base terminal 1108 of transistor Q10.

In operation, voltage sensor 1004 senses the voltage at node 932 (which originates from capacitance 334 in front derailleur control housing 310) and controls switching voltage regulator 1000 and switching circuit 1008 (which together function as a control unit) to supply power to power line 858. More specifically, whenever the sensed voltage is above a prescribed value (e.g., 3.5 volts) voltage sensor 1004 provides a signal for turning on switching voltage regulator 1000 and turning off switching circuit 1008 for providing power from capacitance 334 to power line 858. This is desirable when capacitance 334 is sufficiently charged by dynamo 326. Conversely, whenever the sensed voltage is below the prescribed value, voltage sensor 1004 provides a signal for turning off switching voltage regulator 1000 and turning on switching circuit 1008 for providing power from battery 124 to power line 858. This typically occurs when the bicycle is moving slowly or has stopped and dynamo 326 is not able to sufficiently charge capacitance 334.

In this embodiment, CPU 116 may override the normal operation of voltage sensor 1004, voltage regulator 1000 and switching circuit 1008. For example, suppose CPU 318 in front derailleur control housing 310 issues a command to CPU 116 in display housing 100 to operate in a particular mode, wherein CPU 116 normally uses power from battery

124 when operating in that mode. If battery voltage sensor 1090 in CPU 116 determines that the voltage of battery 124 is above a prescribed value (e.g., 3.5 volts), then CPU 116 may provide signals on first power supply switch override terminal 1096 and second power supply switch override terminal 1104 to turn off switching voltage regulator 1000 and turn on switching unit 1008, even when the voltage at node 932 normally would result in power being supplied from capacitance 334. As a result, power from battery 124 is supplied to power line 858 rather than from capacitance 334. If battery voltage sensor 1090 in CPU 116 determines that the voltage of battery 124 is below the prescribed value, then the command from front derailleur control housing 310 may be disregarded, and voltage sensor 1004 may continue its normal operation.

While the above is a description of various embodiments of inventive features, further modifications may be employed without departing from the spirit and scope of such inventive features. The size, shape, location or orientation of the various components may be changed as desired. Components that are shown directly connected or contacting each other may have intermediate structures disposed between them. The functions of one element may be performed by two, and vice versa. The number of switches, transistors, resistances and capacitances will depend upon the application and their assigned function. Power and data communication could occur bidirectionally. Power may be supplied directly from dynamo 326, and the various power sources could be combined or substituted with other power sources such as solar or various fuel cells. Hardware, firmware and software implementations are readily within one of ordinary skill. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the inventive features should not be limited by the specific structures disclosed or the apparent initial focus on a particular structure or feature.

What is claimed is:

1. A power control apparatus for a bicycle that uses a first power supply and a second power supply to provide electrical power comprising:
    a voltage sensor for sensing a voltage from the first power supply;
    a control unit coupled to the voltage sensor and coupled for receiving power from the first power supply and the second power supply;
    wherein the control unit comprises:
        a first power supply switch coupled for outputting power from the first power supply; and
        a separate second power supply switch coupled for outputting power from the second power supply;
    wherein the control unit outputs power from the first power supply when the voltage sensed by the voltage sensor is above a first selected value, wherein the control unit outputs power from the second power supply when the voltage sensed by the voltage sensor is below a second selected value, and wherein the voltage sensor actually switches the first power supply switch and the second power supply switch a second power supply voltage sensor for sensing a voltage from the second power supply, wherein the control unit is coupled to the second power supply voltage sensor, wherein the control unit outputs power from the first power supply when the voltage sensed by the second power supply voltage sensor is below a third selected value, and wherein the control unit outputs power from the second power supply when the voltage sensed by the second power supply voltage sensor is above a fourth selected value.

2. The apparatus according to claim 1 wherein the control unit outputs power only from the second power supply when the voltage sensed by the voltage sensor is below the second selected value.

3. The apparatus according to claim 1 wherein the control unit outputs power only from the first power supply when the voltage sensed by the voltage sensor is above the first selected value.

4. The apparatus according to claim 1 wherein the first power supply switch comprises a switching voltage regulator.

5. The apparatus according to claim 1 wherein the second power supply switch comprises a transistor.

6. The apparatus according to claim 1 wherein the control unit includes a processor coupled to the first power supply switch and to the second power supply switch, wherein the first power supply switch and the second power supply switch are controlled at least in part by the processor.

7. The apparatus according to claim 6 further comprising a second power supply voltage sensor for sensing a voltage from the second power supply, wherein the processor is coupled to the second power supply voltage sensor, and wherein the processor controls the first power supply switch and the second power supply switch in response to the voltage sensed by the second power supply voltage sensor.

8. The apparatus according to claim 7 wherein the processor controls the first power supply switch to output power from the first power supply when the voltage sensed by the second power supply voltage sensor is below a third selected value, and wherein the processor controls the second power supply switch to output power from the second power supply when the voltage sensed by the second power supply voltage sensor is above a fourth selected value.

9. The apparatus according to claim 8 wherein the first selected value equals the second selected value.

10. The apparatus according to claim 8 wherein the third selected value equals the fourth selected value.

11. The apparatus according to claim 8 wherein the first selected value equals the second selected value, and wherein the third selected value equals the fourth selected value.

12. The apparatus according to claim 8 wherein the first power supply switch comprises a switching voltage regulator, and wherein the second power supply switch comprises a transistor.

13. The apparatus according to claim 1 further comprising a housing, wherein the voltage sensor and the control unit are both disposed within the housing.

14. The apparatus according to claim 1 wherein the first selected value equals the second selected value.

15. The apparatus according to claim 1 wherein the control unit switches power from the first power supply to the second power supply when the voltage sensed by the voltage sensor is below the second selected value.

16. The apparatus according to claim 1 wherein the control unit switches power from the second power supply to the first power supply when the voltage sensed by the voltage sensor is above the first selected value.

17. The apparatus according to claim 1 wherein the control unit switches power from the first power supply to the second power supply when the voltage sensed by the voltage sensor is below the second selected value, and wherein the control unit switches power from the second power supply back to the first power supply when the voltage sensed by the voltage sensor is above the first selected value.

18. The apparatus according to claim 17 wherein the first selected value equals the second selected value.

19. The apparatus according to claim 1 wherein the first selected value equals the second selected value.

20. The apparatus according to claim 1 wherein the third selected value equals the fourth selected value.

21. The apparatus according to claim 1 wherein the first selected value equals the second selected value, and wherein the third selected value equals the fourth selected value.

22. A power control apparatus for a bicycle that uses a first power supply and a second power supply to provide electrical power comprising:
   a voltage sensor for sensing a voltage from the first power supply;
   a control unit coupled to the voltage sensor and coupled for receiving power from the first power supply and the second power supply;
   wherein the control unit outputs power from the first power supply when the voltage sensed by the voltage sensor is above a first selected value, and wherein the control unit outputs power from the second power supply when the voltage sensed by the voltage sensor is below a second selected value;
   a second power supply voltage sensor for sensing a voltage from the second power supply, wherein the control unit is coupled to the second power supply voltage sensor;
   wherein the control unit outputs power from the first power supply when the voltage sensed by the second power supply voltage sensor is below a third selected value, and wherein the control unit outputs power from the second power supply when the voltage sensed by the second power supply voltage sensor is above a fourth selected value; and
   wherein the control unit outputs power only from the second power supply when the voltage sensed by the second power supply voltage sensor is above the fourth selected value even when the voltage sensed by the voltage sensor is above the first selected value.

23. A power control apparatus for a bicycle that uses a first power supply and a second power supply to provide electrical power comprising:
   a voltage sensor for sensing a voltage from the first power supply;
   a control unit coupled to the voltage sensor and coupled for receiving power from the first power supply and the second power supply;
   wherein the control unit comprises:
      a first power supply switch coupled for outputting power from the first power supply;
      a second power supply switch coupled for outputting power from the second power supply; and
      a processor coupled to the first power supply switch and to the second power supply switch, wherein the first power supply switch and the second power supply switch are controlled at least in part by the processor;
   wherein the control unit outputs power from the first power supply when the voltage sensed by the voltage sensor is above a first selected value, and wherein the control unit outputs power from the second power supply when the voltage sensed by the voltage sensor is below a second selected value;
   a second power supply voltage sensor for sensing a voltage from the second power supply, wherein the processor is coupled to the second power supply voltage sensor, and wherein the processor controls the first power supply switch and the second power supply switch in response to the voltage sensed by the second power supply voltage sensor;
   wherein the processor controls the first power supply switch to output power from the first power supply when the voltage sensed by the second power supply voltage sensor is below a third selected value, and wherein the processor controls the second power supply switch to output power from the second power supply when the voltage sensed by the second power supply voltage sensor is above a fourth selected value; and
   wherein the processor controls the first power supply switch and the second power supply switch to output power only from the second power supply when the voltage sensed by the second power supply voltage sensor is above the fourth selected value even when the voltage sensed by the voltage sensor is above the first selected value.

* * * * *